Patented June 20, 1939

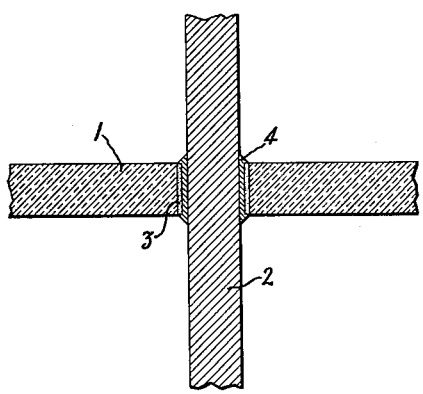

2,163,410

UNITED STATES PATENT OFFICE 2,163,410

CERAMIC-TO-METAL SEAL

Hans Pulfrich, Berlin-Friedenau, and Richard Magner, Berlin, Germany, assignors to General Electric Company, a corporation of New York Application November 22, 1937, Serial No. 175,960
In Germany February 12, 1937

3 Claims. (Cl. 49—81)

The present invention relates to the art of uniting ceramic and metallic materials.

Attempts to join metal and ceramic parts are generally attended with considerable difficulties. In making metal-to-ceramic junctions, it has been customary to use a glass flux or paste, or glazing material, between the parts. However, this not only impairs the electrical properties of ceramic substances, but renders the junctions sensitive to temperature effects. Under temperature changes, the mechanical strength, particularly the tensile strength, of an intermediate layer of glazing material is effected.

In the co-pending application of Hans Pulfrich, Serial No. 166,902, filed October 1, 1937, and assigned to the same assignee as the present invention, a method of making a vacuum-tight joint between metal and ceramic parts, without the usual glazing, is described. In accordance with the invention therein disclosed and claimed, a metal powder of high melting point is spread on the ceramic body, and is sintered or cemented to the body at a temperature higher than the fusion point of the eutectic solid solution having the lowest fusion point in the ceramic body. A ceramic material so metallized then may be soldered to metal.

It is an object of the present invention to provide certain improvements and modifications in the art of uniting or sealing ceramic and metallic parts to each other.

The novel features of the present invention are set forth in the appended claims. The invention itself, however, will be understood most readily from the following description when considered in connection with the accompanying drawing in which the single figure represents a cross-sectional view of a composite structure embodying the invention and, more particularly, illustrates a cross-sectional view of a metallic member sealed to a part of a ceramic body in accordance with the invention. In this figure, the reference numeral 1 designates the ceramic body; 2, a metallic member passing through an opening in said body; 3, a thin layer of powdered refractory metal anchored in the surfaces of the side walls of the opening in the ceramic body; and 4, a mass of solder uniting or bonding the member 2 with the layer 3 and forming a vacuum-tight seal between said member and the ceramic body 1. The particular structural arrangement shown in the figure is merely for the purpose of illustrating the invention and, as will be obvious from the following description, the invention is not limited thereto.

Tests have shown that the chemical composition of ceramic parts has a material influence on the strength of the connection between metallic and ceramic bodies. This factor heretofore has not been taken into account sufficiently.

One embodiment of the present invention is based on our discovery that soldered connections adhere very well to ceramic bodies that contain one or more oxides of the class consisting of titanium oxide, zirconium oxide, hafnium oxide and thorium oxide. This improved adherence may result from the particularly high tensile strength of ceramic bodies containing such oxides. Or, it may be due to an interaction, probably chemical in nature, between the components of such a ceramic material and a metallic carrier layer which is provided on the ceramic body as a soldering base, prior to the soldering operation, as more fully set forth in the aforementioned Pulfrich application Serial No. 166,902.

A ceramic composition containing zirconium oxide has proved particularly effective in making metal-to-ceramic joints that are vacuum-tight, that is, impervious to the passage of a gas therethrough. An illustrative example of such a composition follows:

| | Per cent by weight |
|---|---|
| Zirconium oxide | approximately 4 |
| Kaolin | approximately 11 |
| Soapstone | approximately 85 |

A ceramic body thus formed has low dielectric losses (tangent $\delta$ approximately $5 \cdot 10^{-4}$ and less).

By using ceramic bodies of the kind described, it is possible to make vacuum-tight joints with metals the coefficients of expansion of which vary greatly from that of the ceramic body. It is possible to solder hermetically, for instance, a ceramic body having a coefficient of linear thermal expansion of approximately $65 \cdot 10^{-7}$ per degree centigrade with an iron pipe having a coefficient of linear thermal expansion of approximately $130 \cdot 10^{-7}$, using silver as the solder.

In carrying the present invention into effect, a layer 3 of refractory metal powder is applied to, and adhesively held by a ceramic body 1. This layer serves as a base for a mass of solder 4, which bonds said layer to a metallic member 2 and forms a vacuum-tight seal between the metallic member and the ceramic body. In all cases the metallic powder employed in forming the carrier layer is one that will not soften or fuse at the melting temperature of the solder used, or at the melting point of the eutectic of lowest melting point that is present in the ceramic substance.

Preferably powdered or finely divided molybdenum or rhenium constitutes the thin adhering layer which is formed on the surface of the ceramic body. Tungsten or other refractory metallic powders also may be used. Advantageously, the metallic powder is applied to the ceramic material in the form of a dispersion in a suitable suspension medium, for example collodion. It is then fused or sintered to the surface of the ceramic body in such a manner that, although the formed layer adheres solidly to the base, the individual metallic grains are only loosely connected with each other. As a result of such practice the thermal expansion of the base metal utilized has no significant bearing upon the strength and tightness of the soldered connection.

In order to obtain a particularly effective joint between the ceramic and metallic members, it is advantageous to use a solder which yields unelastically and which flows, under tensile stress, before the tensile strength of the ceramic part is exceeded. Of course, the solder must flow as a uniform mass so that no openings will be formed that would cause the soldered connection to permit the passage of gas therethrough. The tearing limit of the solder may lie above the tensile strength limit of the ceramic body. As solders, in view of the increased strength of the ceramic bodies used in practicing the present invention, come into consideration silver-copper-nickel alloys. It is desirable to use a solder the flow limit of which is not detrimentally affected by the absorption of metal from the metallic carrier layer or from the soldered metal part. As a general rule, it is advantageous to use a solder having a melting point below the eutectic of lowest melting point formed by components of the ceramic body. Silver has proved to be a good solder for joining a tungsten-coated ceramic body with an iron or iron-nickel metallic member.

The invention can be used to advantage in the manufacture of incandescent lamps and electric discharge apparatus of various kinds, for example, in making amplifier tubes, transmitter tubes, X-ray tubes, and so forth. It also has application in other fields of engineering, for instance in the manufacture of distillation apparatus and transportation tanks for the chemical industry.

By using solders that are resistant to mercury or by protecting the joints from contact with mercury, the invention also can be used to advantage in the manufacture of mercury-vapor rectifiers and similar electric discharge apparatus.

Ceramic materials used in forming hermetically-sealed, vacuum-tight connections with metallic members in accordance with the present invention also may be hermetically sealed to each other by the method herein described.

What we claim as new and desire to secure by Letters Patent of the United States is:

1. In combination, a metal member, a ceramic body containing oxide of the class consisting of titanium oxide, zirconium oxide, hafnium oxide and thorium oxide, an adhering layer of refractory metal powder on the surface of said ceramic body, the individual particles of the said metal powder being only loosely connected with each other, and a mass of solder uniting said metal member with said layer of refractory metal and sealing said metal member to said ceramic body.

2. In an article of manufacture, the combination of a metal member, a ceramic body containing zirconium oxide, a layer of powdered molybdenum adhesively held to said ceramic body, the individual particles of the said powdered molybdenum being only loosely connected with each other, and a mass of solder bonding said metal member with said layer of powdered molybdenum and forming a vacuum-tight seal between said metal member and said ceramic body.

3. In an article of manufacture, the combination of a metal member, a ceramic body formed of, by weight, approximately 4 per cent zirconium oxide, approximately 11 per cent kaolin and approximately 85 per cent soapstone, a layer of powdered molybdenum fused to said ceramic body, the individual particles of the said powdered molybdenum being only loosely connected with each other, and a mass of solder bonding said metal member with said layer of powdered molybdenum and forming a vacuum-tight seal between said metal member and said ceramic body.

HANS PULFRICH.
RICHARD MAGNER.